Jan. 9, 1968     M. E. CAVANAUGH     3,363,143
ALTERNATING CURRENT SWITCHING POWER CONTACT
WITH SOFT START AND CIRCUIT PROTECTION
Filed Sept. 7, 1965                2 Sheets-Sheet 1
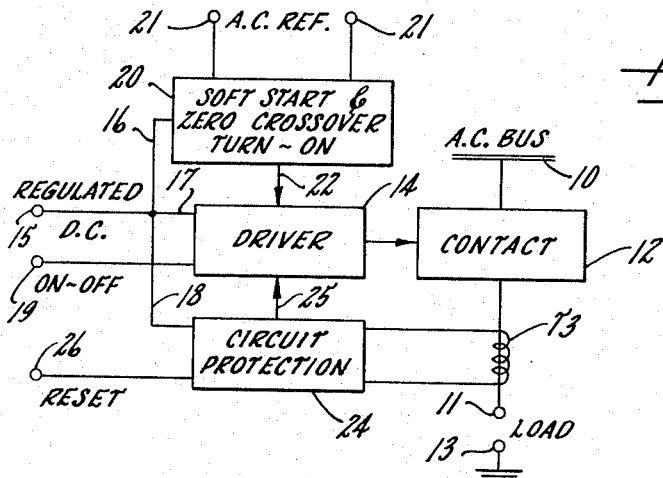
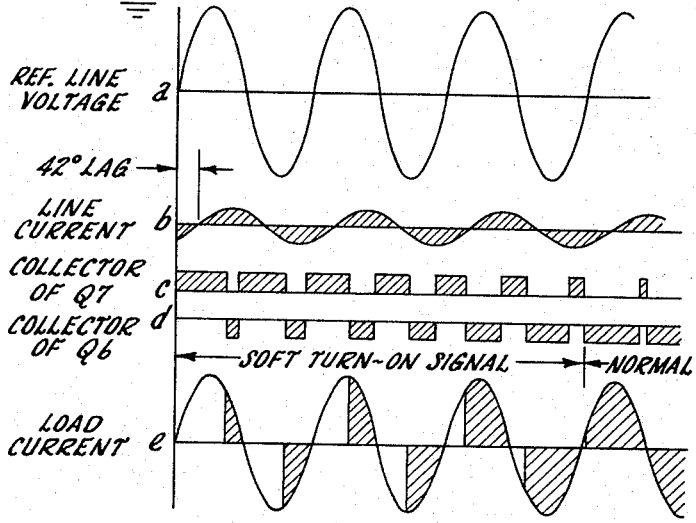
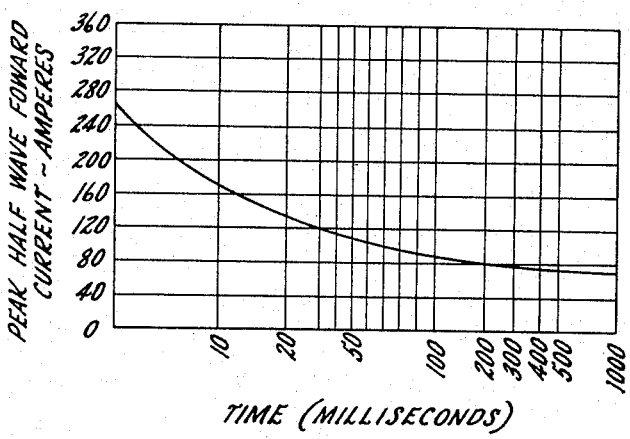
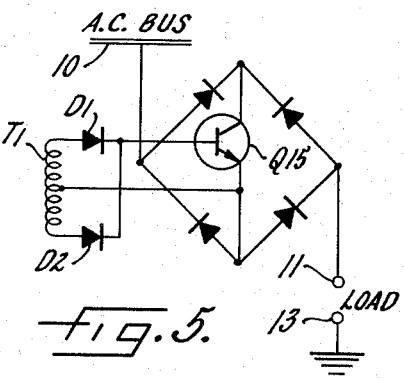
INVENTOR.
Marion E. Cavanaugh,
BY
H. H. Losche
Att'ys.

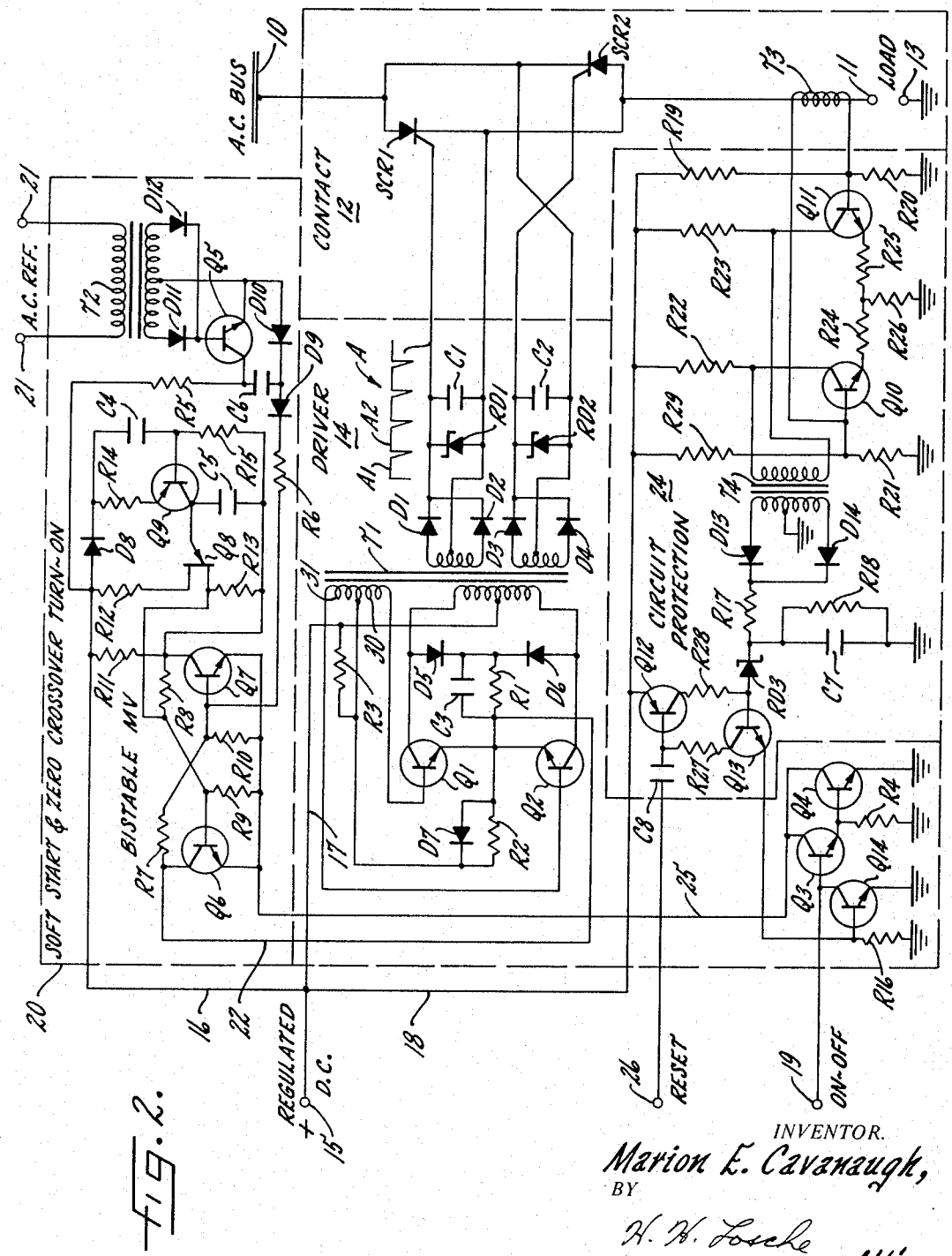

United States Patent Office 3,363,143
Patented Jan. 9, 1968

3,363,143
ALTERNATING CURRENT SWITCHING POWER CONTACT WITH SOFT START AND CIRCUIT PROTECTION
Marion E. Cavanaugh, Dallas, Tex., assignor, by mesne assignments, to the United States of America as represented by the Secretary of the Navy
Filed Sept. 7, 1965, Ser. No. 485,645
9 Claims. (Cl. 317—33)

This invention relates to power contacts for switching alternating current (AC) voltage to electrical loads and more particularly to a static or solid state alternating current power contact circuit for initially switching an alternating current softly or gradually to full power to electrical loads with circuit protection against excessive load current drain.

In many well known power switching devices electromechanical relays have been used to switch electrical power to electrical loads by the use of a low control voltage power source to energize the relay coil. The necessity of speeding up the operation of these power contacts resulted in the use of power vacuum tubes, such as thyratrons, and still later static switches, such as solid state devices, to connect and disconnect electrical power to electrical loads. The solid state devices are not subject to enlargement to handle large currents as are electromechanical relays since their power limitations lie in the solid state compositions. The problem, then, is not so simple as substituting solid state switching devices, such as power transistors or silicon controlled rectifiers (SCR's), for thyrations or electromechanical relays, but to devise such solid state power contact circuits with control circuitry to eliminate initial high peak current surges, as caused by incandescent lamps or the like, and to provide protection to the solid state circuit against fault currents which would normally damage the solid state devices by excessive current flow.

For the power contact device, silicon power transistors can be used for the switching contacts; however, devices with sufficient voltage ratings are limited. The voltage drop of SCR's and saturated power transistors are comparable although circuits can be designed to provide lower voltage drops with transistors. However, the contact drop in either device is a small percentage of the supply voltage, so this is not a deciding factor. The desirable peak forward and reverse voltage rating of the device should be about 300 volts for power contacts switching single phase loads and about 500 volts for contacts switching three phase loads. The $I^2t$ ratings of the device must be sufficiently high to be able to withstand the high fault currents that can be obtained in the environment of use, as for example, a typical aircraft electrical system. These fault currents can reach three times rated source current and have been found to reach even four times rated source current for durations of less than 10 milliseconds, As an example, in a typical 20 kva., 3 $\phi$, 400 cycle aircraft electrical system, fault currents of 260 amperes per phase have been recorded. Since the minimum fault current interruption time of SCR's is one-half cycle, the SCR must withstand the 260 amperes for 1.25 milliseconds (½ of 400 cycle). The minimum $I^2t$ rating of the device must be $$(260)^2(.00125) = 85.5 \text{ amperes}^2 t$$

There are solid state devices having an $I^2t$ rating of 275 amperes$^2 t$ which can withstand currents of $$\sqrt{\frac{275}{.00125}} = 470 \text{ amperes}$$

for one-half cycle of a 400 cycle system. Surge current ratings of SCR's must be sufficient to withstand the currents that will occur during transient conditions. It is desirable for the device to be able to reach voltages of 190 volts RMS for 100 milliseconds. Although SCR surge current ratings are not given on data sheets for a 400 cycle system, the average current ratings given for 60 cycle operation are also valid for 400 cycle operation. Therefore, it can be reasonably assumed that the surge current ratings given for a 60 cycle system over a period of several cycles would hold true for a 400 cycle system for the same period of time.

In the present invention SCR's are used for the power contact since they are inherently efficient switching devices for the reason that the contact drop is essentially independent of load current. The combined losses consist of losses due to the forward voltage drop during conduction, forward and reverse leakage during blocking, gate turn-on signal, and switching. However, only losses due to the forward voltage drop will significantly affect the efficiency of the contact. The efficiency of the contact is given as:

$$\text{Efficiency} \cong \left(1 - \frac{I_L V_F}{V_{cc} I_L}\right) 100$$

$$\cong \left(1 - \frac{V_F}{V_{cc}}\right) 100$$

where $V_F$ is the forward contact voltage drop at the load current and $V_{cc}$ is the supply voltage. Since the maximum allowable voltage drop for the AC power contact is 1.0 volt, the minimum efficiency that can be obtained is approximately 99%. The SCR's are driven by a solid state or transistor driver circuit producing continuous gating or commutating signals to turn "on" the SCR's for inductive as well as resistive loading. The gating signals can be controlled to provide the desired gate pulse width to enable zero crossover turn-on as well as inductive loading turn-on. Since the saturation resistance of SCR's is essentially independent of the gate signal and the load current, the device does not exhibit an inherent current limiting characteristic as do power transistors. Therefore, in order to be able to distinguish a fault condition from loads requiring high in-rush currents, such as incandescent lamps, it is necessary that the power contact "soft-start" or build up gradually into such loads. This is accomplished by additional solid state or transistor circuitry. Also, transistor circuitry is devised to protect the SCR contact switches from excessive currents. It is therefore a general object of this invention to provide static or solid state circuitry to switch an alternating current voltage source to inductive and resistive electrical loads by initially "soft-starting" the power to the load at the zero crossover points of the supply voltage under the protection of a circuit to switch off the voltage source when excessive load currents appear.

These and other objects and the attendant advantages, features, and uses will become more apparent to those skilled in the art as a more detailed description proceeds when considered along with the accompanying drawings, in which:

FIGURE 1 is a block diagram of the A.C. switching contact and circuitry therefor;

FIGURE 2 is a circuit schematic diagram of a block circuit shown in FIGURE 1;

FIGURE 3 is a series of waveforms taken at various terminals of the circuit shown in FIGURE 2;

FIGURE 4 is a current-ampere and time chart of a preferred SCR used in the circuit of FIGURE 2; and FIGURE 5 is a modification of the switch power contact shown used in FIGURE 2.

Referring more particularly to FIGURE 1 where a block diagram of the power contact switching device is shown, it is desirable to switch the power rapidly from an A.C. bus shown at 10 to inductive and resistive loads coupled to the terminal 11 through a power contact switching device 12. It is to be understood that the A.C. bus 10 is completed in its circuit through a neutral or ground lead shown and connected to the terminal 13. The power contact switching device 12 is switchably controlled by a driver circuit 14 having a direct current (DC) regulated voltage supplied to terminal 15 and over branch conductors 16, 17, and 18. Driver circuit 14 is turned "off" and "on" by a voltage signal adapted to be coupled to the terminal 19. The driver circuit 14 is controlled in its driving operation and frequency by a soft start and zero crossover turn-on circuit 20 supplied by an A.C. reference voltage at terminals 21 which reference voltage is in synchronism with or coupled to the A.C. voltage bus 10 through a stepdown transformer, or any suitable means. The soft start and zero crossover turn-on circuit 20 is coupled to control the driver circuit 14 through the conductor means 22. The power contact device 12 is also protected from excessive currents drawn by the load as a result of load faults, or the like. This current is sampled by the transformer coupling T3 coupled to a circuit protection device 24 capable of turning off the driver circuit 14 by way of a coupling means 25. The circuit protection device 24 may be reset by a voltage applied to the reset terminal 26, as will hereinafter be made clear.

Referring more particularly to FIGURE 2 wherein like reference characters refer to like parts as shown and described for FIGURE 1, the A.C. bus supply voltage on conductor means 10 is coupled through the power contact 12 consisting of a parallel circuit containing silicon controlled rectifiers SCR1 and SCR2 to the load terminal 11. SCR1 and SCR2 are coupled in the opposite sense to conduct the forward and reverse currents of the A.C. voltage supplied from the A.C. bus 10 to the load 11.

The gating electrodes and the cathode electrodes of SCR1 and SCR2 are each coupled to two rectifying circuits including rectifying diodes D1, D2 and D3, D4, respectively, oriented to provide positive voltage pulses to the gating electrodes of SCR1 and SCR2. D1, D2, D3, and D4 are provided in pairs to deliver full wave rectification to the gating electrodes. A voltage oscillating between positive and negative limits is supplied to the secondary windings of the transformer T1 which is applied to the anodes of the rectifying diodes D1, D2, D3, and D4, each secondary winding being center tapped and coupled to the corresponding cathode of the SCR providing the two separate rectifying circuits. The center tap of the secondary winding for the rectifying diodes D1 and D2 is coupled to the anode of a Zener diode RD1 with its cathode coupled in common to the cathodes of D1 and D2 to limit the positive voltage swings to some predetermined value, such as a 6 volt value. A Zener diode RD2 provides the same function for the lower rectifying circuit to the SCR2. Capacitors C1 and C2 are placed in these two rectifying circuits, respectively, to smooth or filter the rectified voltage, each rectifying voltage circuit producing a waveform as shown by the waveform A. The primary winding of transformer T1 is center tapped and coupled to the regulated D.C. voltage 15 by way of the conductor means 17, the end lead of the upper primary winding being coupled directly to the collector of a transistor Q1 while the lead of the lower primary winding is coupled directly to the collector of a transistor Q2. The base of transistor Q1 is coupled to the lower half 30 of a secondary winding of transformer T1 and the base of transistor Q2 is coupled to the upper half 31 of the center tapped secondary winding, the center tap of secondary windings 31 and 32 being coupled through a resistor R3 to the regulated D.C. voltage applied by way of conductor means 17. This center tap of secondary winding 30, 31 is also coupled through a resistor R2 and a diode D7 in parallel in common to the emitters of transistors Q1 and Q2. The common emitter coupling of transistors Q1 and Q2 is also coupled to the input lead 22 from the soft start and zero crossover turn-on circuit 20. The common emitter coupling is also coupled in parallel through a resistor R1 and a capacitor C3 to the common cathode coupling of diodes D5 and D6, the anode of D5 being coupled directly to the collector of transistor Q1 and the anode of D6 being coupled directly to the collector of transistor Q2. Whenever a pulsed negative voltage is applied to the common emitters of transistors Q1 and Q2, an oscillation will be set up alternately in transistors Q1 and Q2 to produce alternate oscillations in the primary winding of transformer T1. The common emitter coupling of transistors Q1 and Q2 is biased through the resistor R2 and the resistor R3 from the regulated D.C. voltage source 15 by way of conductor 17, and the bases of transistors Q1, Q2 coupled through the secondaries 30 and 31 assure alternate conduction of transistors Q1 and Q2. The diode D7 prevents any positive voltage swings on the emitter greater than the emitter biasing voltage therefor. Diodes D5 and D6 enhance the generated oscillations in the primary of transformer T1. Since D1 and D2 in the circuit to SCR1 and D3 and D4 in the circuit to SCR2 are full wave rectifying, each oscillation will provide a positive gating pulse simultaneously to SCR1 and SCR2 to gate these SCR's to connect the A.C. bus source 10 to the load terminal 11 in a commutating manner as shown by the waveform A. Since SCR's are known to inherently continue conduction once they are gated into conduction and a reverse bias is necessary to cut such SCR's off, the commutating voltage, as shown by A, normally cuts off SCR1 and SCR2 simultaneously when the rectified voltage from the two secondaries of transformer T1 cease. Accordingly, on the application of negative pulse signals by way of conductor 22 to the common bases of transistors Q1 and Q2, the power contact 12 will be turned "on" for supplying alternating current voltage to the load terminal 11.

The driver circuit 14 is under the control of the soft start and zero crossover turn-on circuit 20 which develops negative pulses on the output conductor 22 from a bistable multivibrator consisting of transistors Q6 and Q7 grounded through the lead 25 in the driver circuit including transistors Q3 and Q4 coupled in the manner of a Darlington circuit. Transistors Q3 and Q4 are collector coupled in common to the conductor means 25, the emitter of Q3 being directly coupled to the base of transistor Q4 and biased to ground through a resistor R4. The emitter of transistor Q4 is directly coupled to ground and the base of transistor Q3 is coupled to terminal 19 to which on-off signals are applied. When a positive "on" signal is applied to terminal 19, transistor Q3 will be turned "on" which in turn renders transistor Q4 conductive to connect conductor 25 directly to ground thereby establishing a circuit to ground for the bistable multivibrator circuit. The base of transistor Q7 is coupled through a resistor R6 to the cathode of a diode D9, the anode of which is coupled to the cathode of a diode D10, the anode of D10 being coupled to the center tap of a secondary winding of transformer T2. The primary winding of transformer T2 is coupled to an alternating current voltage reference 21 which is either synchronized to the A.C. voltage of bus 10 or coupled thereto through stepdown transformer means, or the like, to maintain synchronization between the A.C. voltage reference at 21 and the A.C. voltage of bus 10. This synchronization can be obtained by any known and suitable means. The voltage output of the secondary windings over transformer T2 is rectified by rectifying diodes D11 and D12, the output of which is coupled in common to the base of a transistor Q5. The emitter of transistor Q5 is directly coupled to the center tap of transformer T2 providing a base emitter circuit, and the collector of transformer Q5 is coupled to the regulated D.C. voltage supply 15 by way of conductor 16 through a load resistor R5. The collector of transistor Q5 is also coupled to one plate of a capacitor C6, the opposite plate of which is coupled to the anode-cathode coupling of diodes D9 and D10. The D.C. regulated voltage from terminal 15 by way of conductor 16 is also coupled by way of resistor R11 to the collector of transistor Q7, this collector being coupled through resistor R8 to the base of transistor Q6 while the collector of transistor Q6 is coupled to the base of transistor Q7 through the resistor R7. The base electrode of transistor Q6 is biased from ground through resistor R9 and the base of transistor Q7 is biased from ground through the resistor R10. The collector of transistor Q7 is coupled through a resistor R15 to the base of a transistor Q9, this base electrode also being coupled to one plate of a storage capacitor C4, the opposite plate of which is coupled to the cathode of a diode D8 the anode of which is coupled to the regulated D.C. voltage supply conductor 16. The emitter of transistor Q9 is supplied emitter voltage through resistor R14 from the cathode of diode D8 and the collector of transistor Q9 is coupled to one plate of a capacitor C5, the opposite plates of which is coupled to the collector of transistor Q7. The collector of transistor Q9 is also to the emitter of a unijunction transistor Q8, base one of which is coupled through a resistor R12 to the regulated voltage supply conductor 16, and base two of which is coupled directly to the base of transistor Q6 and through a resistor R13 to the collector of transistor Q7. The unijunction transistors Q8 and its related circuitry R12, R13, R14, and C5 provide a relaxation oscillator which is controlled in its oscillation frequency by the transistor switch means Q9 in the oscillator circuit, as above described. The A.C. reference voltage applied at terminals 21 will be rectified in the secondary circuit, including the rectifying diodes D11 and D12, to produce full wave voltage pulses on the base of transistor Q5 momentarily placing transistor Q5 into conduction in a sequence of the frequency of the A.C. reference voltage. The first rectifying pulse placing transistor Q5 into conduction will produce a negative voltage pulse on the collector thereof which will be blocked by the diode D9 from reaching the base of transistor Q7. As the first rectified pulse approaches zero crossover of the A.C. reference voltage, transistor Q5 will be cut off producing a positive going voltage pulse on the collector thereof which is conducted through coupling capacitor C6 and diode D9 to the base of transistor Q7 as a positive pulse thereby placing transistor Q7 into conduction. The collector voltage of transistor Q7 will be negative going and applied to the base of the PNP type transistor Q9 and likewise to one plate of the storage capacitor C4 giving it an initial charge. The initial charge of capacitor C4 would delay the initial conduction of transistor Q9 by an amount determined by the resistor R14 and capacitor C5 to produce a positive voltage on the emitter of the unijunction transistor Q8 placing it into conduction to develop a positive voltage across resistor R13 which is applied directly to the base of transistor Q6 placing this transistor in a conductive state. When transistor Q6 goes into conduction (and transistor Q7 ceases conduction) its collector voltage will drop dropping the common collector voltage of transistors Q1 and Q2 to produce one-half an oscillation to develop a first commutating pulse A1 to both the SCR1 and SCR2 power contacts. Transistor Q6 will remain in conduction until the next succeeding rectifying pulse turns transistor Q5 "on" and "off," cutoff of transistor Q5 producing the second positive pulse to the base of transistor Q7 flipping conduction of the bistable multivibrator the second time. The second conduction period of transistor Q7 further charges the storage capacitor C4 lessening the delay time of conduction for transistor Q9 thereby placing transistor Q6 into conduction in a shorter period of time between reference pulses to produce the second gating pulse A2 of the commutating pulses A. The commutating pulses A do not show the soft start but only the normal commutating pulses. Accordingly, as successive pulses are rectified and amplified by transistor Q5 repeating the conduction periods of transistor Q7, capacitor C4 is building up in voltage to reduce the delay time of conduction for transistor Q9 and consequently, the conduction of the unijunction Q8 of the relaxation oscillator placing transistor Q6 into longer conduction periods until after several oscillations, capacitor C4 will be fully charged and the bistable multivibrator will be operating with transistor Q6 in large conduction periods with respect to transistor Q7 since transistor Q6 will remain "on" until it is cut "off" by the conduction period of transistor Q7. This initial starting of the circuit 20 to produce longer and longer negative biases on the common emitter coupling of transistors Q1 and Q2 in the driver circuit provide the "soft start" function for the contact driver circuit 12.

Referring more particularly to FIGURE 3, waveform a illustrates the reference line voltage applied to the terminals 21 which is in synchronism with the load voltage shown on line e. Where the D.C. load is primarily inductive an extreme condition is shown in line b of FIGURE 3, where the current is lagging the voltage by as much as 42° giving a power factor of .75. Line c of FIGURE 3 illustrates the conduction periods of transistor Q7 during the "soft start" and line d of FIGURE 3 illustrates the conduction periods of transistor Q6 in which it may be noted that the conduction periods become increasingly longer to provide the "soft start" until the normal conduction periods are stabilized. Line e illustrates these conduction periods just preceding the crossover point, each half cycle being switched "on" for greater periods of time by control of the gating terminal of SCR1 and SCR2 until full wave "switch-on" time is accomplished. After normal operation is reached, the cutoff periods will appear in coincidence with conduction periods of transistor Q7 to cause the commutating effect as shown by the waveform A on the power contact SCR's. Accordingly, at any time that the commutating voltages A are discontinued, the trailing edge of the last commutating pulse will reverse bias SCR1 and SCR2 disconnecting the bus 10 from the load 11.

As hereinabove stated for FIGURE 1 and again referring to FIGURE 2, transformer winding T3 about the conductor to the load 11 will sample the current to the load which current is applied to the base at transistors Q10 and Q11 having their emitters coupled through resistors R24 and R25, respectively, in common through a resistor R26 to ground potential. Each base is biased by a resistor R20 and R21, respectively, and each collector is provided load current through resistors R22 and R23, respectively, from the regulated D.C. voltage source 15 by way of the conductor means 18. The collector of transistor Q10 is coupled to one lead of a primary winding in a transformer T4, the opposite lead thereof being coupled to the collector of transistor Q11. The secondary of transformer T4 is center tapped to ground, the opposite leads being coupled through rectifying diodes D13 and D14 in common to the input of a resistor R17, the output of this resistor being coupled to the cathode of a Zener diode RD3 and filtered by a parallel circuit of a capacitor C7 and resistor R18 in parallel to ground potential. The anode of the Zener diode RD3 is coupled directly to the base of a transistor Q13 and through a resistor R28 to the collector of a transistor Q12. The collector of transistor Q13 is coupled to the base of transistor Q12 through a resistor R27. The emitter of transistor Q12 is coupled directly to the D.C. regulated voltage conductor 18 while the emitter of transistor Q13 is coupled directly to the base of a transistor Q14 and through a branch conductor to ground through resistor R16. The emitter of transistor Q14 is coupled directly to ground while the collector of this transistor is coupled directly to the base of transistor Q3 on the on-off circuit for the driver circuit 14. Reset terminal 26 is coupled to one plate of a coupling capacitor C8, the opposite plate of which is coupled to the base of transistor Q12. Transistors Q12 and Q13 operate as a holding circuit for any initial voltage pulse applied through the Zener diode RD3 to the base of transistor Q13. Transformer T3 will sample the current being applied to the load, this current being alternately conducted through transistor Q10 and Q11 to produce an alternating current in the primary winding of transformer T4. The secondary winding of transformer T4 rectifies this current to produce a D.C. voltage applied to the cathode of the Zener diode RD3. When the current to the load 11 reaches a predetermined amplitude, the voltage on the cathode of the Zener diode RD3 will reach the Zener voltage to cause an avalanche through the Zener diode RD3 applied to the base of transistor Q13 rendering this transistor conductive. When transistor Q13 becomes conductive, transistor Q12 will be placed into conduction thereby holding transistor Q13 in conduction from the regulated D.C. voltage source 15 to ground through the resistor R16. The only means of stopping conduction of transistor Q12 would be to apply a reset positive voltage to terminal 26 which would cut off transistor Q12 and break the holding circuit. As may be readily recognized, whenever an excessive current does occur in the load circuit causing the Zener diode RD3 to avalanche placing transistors Q12 and Q13 into conduction, the "on" signal at terminal 19 will be short circuited through transistor Q14 cutting transistors Q3 and Q4 off thereby breaking circuit to ground for the soft start and zero crossover turn-on circuit 20 and the driver circuit 14.

As hereinbefore stated, the average current ratings for SCR's used as power contacts are given for 60 cycle operation but 400 cycle operation is ordinarily found in aircraft electrical systems. However, it is assumed that surge current ratings given for 60 cycle systems would hold true for 400 cycle systems for the same period of time. FIGURE 4 illustrates one current and time chart for a known SCR showing that it is possible to operate at approximately 350% current rating for 100 milliseconds without exceeding the surge current rating of the SCR's. SCR1 and SCR2 may be chosen from this group of known SCR's which will withstand these current ratings for surge currents produced in starting electrical loads or for fault currents although "soft start" circuits and protection circuits are provided in producing the power contact SCR's.

As shown in FIGURE 5, a power transistor and diode bridge may be utilized in place of SCR1 and SCR2 to connect and disconnect an A.C. bus voltage supply to a load through the diode bridge which is turned "on" and "off" by transistor Q15. The base of transistor Q15 has rectified voltage applied thereto from diodes D1 and D2 from the secondary of transformer T1 in the same manner as shown and described for transformer T1 in the driver circuit 14 of FIGURE 2. The secondary of transformer T1 is center tapped and coupled to the emitter of transistor Q15, the diodes being oriented to conduct alternating currents in the same direction through transistor Q15 to provide complete alternation of the alternating current to the load terminal 11.

*Operation*

In the operation of the A.C. load switching power contact device let it be assumed that a positive direct current voltage "on" signal is applied at terminal 19 which will complete the circuit of 14 and 20 to ground. The A.C. reference voltage at terminals 21 will be rectified to produce pulses on the cathode of diode D9 just preceding the crossover points of the A.C. voltage to generate conduction periods of transistor Q7. Negative pulses on the collector of Q7 will gradually build up a voltage in the capacitor C4 to trigger Q9 in the unijunction oscillator circuit including transistor Q8 to cause the first few cycles of the bistable multivibrator to increase the conduction periods of transsitor Q6 and decrease the conduction periods of transistor Q7 in alternate sequence. The increasingly longer conduction periods of transistor Q6 cause a "soft start" by virtue of applying negative-going pulses to the common emitter coupling of transistors Q1 and Q2 in the driver circuit 14. This will produce increasingly greater oscillations in the driven circuit 14 until full wave oscillations, as shown by the waveform A, are applied over both rectifying circuits to the cathodes and gating electrodes of the power contacts SCR1 and SCR2 commutating the A.C. bus voltage to the load terminal 11 in direct synchronism with the alternating current voltage supply on bus 10. This connection of the A.C. voltage on bus 10 to the load terminal 11 will continue until a negative voltage "off" signal is applied to terminal 19 disconnecting the ground electrode from the circuitry which will cut off SCR1 and SCR2 by the commutating effect as hereinbefore described. If during the operation of commutating the A.C. voltage on bus 10 with the load terminal 11 an excessive load current drain occurs, the protection circuit 24 will become operative by producing a voltage on the cathode of the Zener diode RD3 and cause it to avalanche and place the holding circuit of transistors Q12 and Q13 into conduction which will remain in conduction to short circuit positive "on" voltage applied at terminal 19, even after the SCR1 and SCR2 are gated "off," to disconnect the supply from the load. When the fault is corrected, a reset positive voltage may be applied to terminal 26 breaking conduction of transistor Q12 thereby breaking the conduction of transistor Q13 which will again place the holding circuit into quiescence at which time the circuit 20 will again "soft start" the power contacts SCR1 and SCR2 in the power contact 12. This will provide "soft start" current to electrical loads, such as to incandescent lamp loads, which normally take high currents in the initial moments of warm-up that often may be severe enough to destroy SCR1 or SCR2. The "soft start" therefore provides protection for SCR1 and SCR2 on the initial turn-on of the circuit as well as being afforded the protection of the protection circuit 24 where faults occur in the load circuits during the operation cycle.

While many modifications and changes may be made in the constructional details and features of this invention to acquire the results obtained through the teaching of this invention, I desire to be limited in the spirit of my invention only by the scope of the appended claims.

I claim:

1. An alternating current switching power contact circuit comprising:
    an alternating current voltage supply and an alternating current load;
    a silicon controlled rectifier means having anode and cathode coupling said alternating current voltage supply and said alternating current load, and having a gating electrode means;
    a driver circuit coupled to said gating electrode means to gate said silicon controlled rectifier means into and out of conduction, said driver circuit having a control input;
    a soft start and zero crossover turn-on circuit having an output coupled to said silicon controlled rectifier control input and having an input of alternating current voltage synchronized with said alternating current voltage supply; and
    a protection circuit having an input coupled to sample the load current and an output coupled to disable said driver circuit when said load current exceeds a predetermined amount whereby said silicon controlled rectifier means provide a power contact for said alternating current voltage source to said load with a controlled soft turn-on and a protection turn-off for high current faults.

2. An alternating current switching power contact circuit as set forth in claim 1 wherein
    said driver circuit is a direct current full wave converter circuit having Zener diode voltage limiting means in the direct current output to said gating electrode means and having a transistor switch in the circuit of said driver circuit to turn said driver circuit "on" and "off".

3. An alternating current switching power contact circuit as set forth in claim 2 wherein said soft start and zero crossover turn-on circuit includes a bistable multivibrator controlled from a unijunction relaxation oscillator in its bistable states, said unijunction relaxation oscillator being triggered by full wave rectified currents from said input of alternating current, said unijunction relaxation oscillator having a storage capacitor to cause said oscillations to build up from an initial start whereby said silicon controlled rectifier means turn on slowly initially to prevent overload current to the load.

4. An alternating current switching power contact circuit as set forth in claim 3 wherein
said protection circuit includes a pair of transistor amplifiers having their bases coupled to opposite leads of a load current sampling transformer constituting said input, the collector outputs thereof being rectified and applied the input of a Zener diode, the output of said Zener diode being coupled to said transistor switch of said driver circuit to switch said driver circuit "off" whenever the Zener voltage of said Zener diode is exceeded.

5. An alternating current switching power contact circuit comprising:
an alternating current voltage supply and electrical loads;
a pair of silicon controlled rectifiers having their anodes and cathodes coupled between said alternating current voltage supply and said electrical loads in the opposite sense, each having a gating electrode;
a driver circuit having a pair of transistors collector coupled through primary windings of opposite sense in a transformer and driven in alternate oscillations from an input thereof, the secondaries of said transformer being coupled through rectifying diodes to the gating electrodes of said silicon controlled rectifiers to gate same to connect said alternating current source to said electrical loads, said driver circuit having a transistor on-off switch network;
a soft start and zero crossover turn-on circuit having an alternating current reference voltage input synchronized with said alternating current voltage supply, said input being rectified to produce pulses just preceeding each alternation crossover, said pulses being applied to a unijunction relaxation oscillator and a bistable multivibrator to trigger same with the unijunction relaxation oscillator having a charging capacitor coupled thereto to build up oscillations from an initial start to control on the output the initial flip-flops of said bistable multivibrator to produce build-up conduction periods on an output of said bistable multivibrator coupled to said input of said driver circuit to cause said silicon controlled rectifiers to control the current flow in increasing amplitude from an initial start to full load capacity; and
a protection circuit having an input coupled to a sampling transformer on said coupling to said electrical loads, said sampled current being converted to a voltage in a converter network proportional to said sampled current and applied to a Zener diode input, the output of which is applied to a transistor holding circuit coupled to said driver circuit transistor on-off switch to switch said driver circuit off whenever the Zener voltage is exceeded whereby said pair of silicon controlled rectifiers are switched to connect said alternating current voltage source to said electrical loads by full wave driving pulses from said driver circuit when said transistor switch is conducting and said electrical loads are disconnected from power when the load current exceeds a predetermined amount.

6. An alternating current switching power contact circuit as set forth in claim 5 wherein
said unijunction relaxation oscillator has said charging capacitor coupled thereto through a transistor amplifier to the emitter of the unijunction transistor, one base electrode of said unijunction transistor being coupled to a direct current voltage source and the other base electrode being coupled to said bistable multivibrator to control its output "on" time.

7. An alternating current switching power contact circuit as set forth in claim 6 wherein
said transformer secondaries of said driven circuit coupled to said gating electrodes of said pair of silicon controlled rectifiers each being across Zener diodes to limit the voltage amplitude applied to said gating electrodes.

8. An alternating current switching power contact as set forth in claim 7 wherein
said transistor holding circuit in said protection circuit includes two collector-to-base coupled transistors, the emitter of one being coupled to a direct current voltage source and the emitter of the other being said coupling to said driver circuit "on-off" switch, the base of said one being coupled to a reset terminal, and the base of said other being said coupling from said Zener diode output whereby any avalanche voltage on the output of said Zener diode will cause said other transistor to conduct immediately causing said one transistor to conduct to maintain said other transistor in conduction until a signal is applied to the the base of said one transistor to back bias same and interrupt conduction of both said one and other holding circuit transistors.

9. An alternating current switching power contact circuit as set forth in claim 8 wherein
said transistor on-off switch network of said driver circuit consists of first, second, and third transistors, the first and second of which have a common collector coupled to the output of said bistable multivibrator and the emitters thereof coupled to zero potential, the collector of said third transistor coupled to the base of said first transistor and to an on-off terminal to which on-off voltage signals may be applied, the emitter of said third transistor being coupled to zero potential, and the base of said third transistor being coupled to the emitter output of said transistor holding circuit whereby an "on" voltage signal on the base of said first transistor will place said first and second transistor into conduction placing said bistable multivibrator in circuit, and a signal from the emitter output of said transistor holding circuit on the base of said third transistor will place the latter transistor into conduction to short the "on" voltage signal.

References Cited
UNITED STATES PATENTS

| | | | |
|---|---|---|---|
| 3,051,892 | 8/1962 | Mintz et al. | 307—88.5 |
| 3,102,226 | 8/1963 | Borkovitz | 323—22 |
| 3,122,697 | 2/1964 | Kauders | 323—22 |
| 3,146,392 | 8/1964 | Sylvan | 323—22 |
| 3,198,989 | 8/1965 | Mahoney | 317—33 |
| 3,237,030 | 2/1966 | Coburn | 317—11 |
| 3,243,689 | 3/1966 | Perrins | 323—22 |
| 3,299,322 | 1/1967 | Roberts | 317—33 |
| 3,305,699 | 2/1967 | Watrous et al. | 317—33 X |

MILTON O. HIRSHFIELD, *Primary Examiner.*

R. V. LUPO, *Assistant Examiner.*